Aug. 15, 1961

W. PRIESEMUTH 2,996,155

DASHPOT DEVICE

Filed March 23, 1960

INVENTOR

Wolfgang Priesemuth

DASHPOT DEVICE

Filed March 23, 1960 3 Sheets-Sheet 2

INVENTOR

Wolfgang Priesemuth

Aug. 15, 1961

W. PRIESEMUTH 2,996,155

DASHPOT DEVICE

Filed March 23, 1960

INVENTOR

Wolfgang Priesemuth

United States Patent Office 2,996,155

Patented Aug. 15, 1961

2,996,155

DASHPOT DEVICE

Wolfgang Priesemuth, Itzehoe-Tegelhorn Danziger Strasse 35, Hamburg, Germany

Filed Mar. 23, 1960, Ser. No. 17,090
Claims priority, application Germany Mar. 23, 1959
4 Claims. (Cl. 188—95)

This invention relates to dashpots and the like, and refers more particularly to a check valve for a damper or dashpot device of the type comprising a substantially closed chamber in which a closely fitting plunger is slidable in opposite directions, and wherein the check valve permits air to flow freely out of the chamber to allow the plunger to move rapidly in one direction but provides for throttled flow of air into the chamber to retard motion of the plunger in the other direction.

Dashpots or dampers of the type here under consideration are used in self-interrupting relays like that disclosed and claimed in the copending application of Wolfgang Priesemuth, Serial No. 821,966, now Patent No. 2,945,930. The plunger in the dashpot of such a relay is made of magnetic material and cooperates with a solenoid which, when energized, moves the plunger in one direction, against the bias of a spring. The check valve which controls flow of air into and out of the dashpot chamber usually permits the plunger to move freely in the direction in which it is drawn by the solenoid but retards motion of the plunger in the direction in which it is actuated by the biasing spring, thereby minimizing the intervals during which the solenoid draws current but providing for a working cycle of substantial duration.

It will be appreciated that a damper or dashpot of the character described has utility in numerous other applications which require a mechanism for producing a controlled time delay, but in every case the important desiderata of such a device are low cost, simplicity and dependability. Obviously one of the crucial elements of a dashpot mechanism is the check valve which controls flow of air into and out of the chamber, since the successful operation of the device is entirely dependent upon the efficiency and reliability of that valve.

With the foregoing in mind, it is a general object of this invention to provide a check valve for a damper or dashpot device of the character described, whereby air is permitted to flow freely out of the dashpot chamber but which provides for throttled flow of air into the chamber, and which valve has only three very simple and inexpensive parts so that low cost, simplicity and dependability are virtually inherent features of the valve.

Another and more specific object of this invention resides in the provision of a unitary valve member for a check valve of the character described which may be readily stamped or otherwise formed of rubber or rubber-like sheet material or metal foil, and which, despite its extreme simplicity, provides a very good seal around an air outlet port in a dashpot or the like.

It is also a specific object of this invention to provide a unitary spring member adapted to cooperate with the valve member just described and which is adapted to be stamped or otherwise readily formed from light spring stock.

Another specific object of this invention is to provide a unitary reinforcing member for a check valve of the character described, adapted to be flatwise interposed between the two members above referred to, namely the valve member and the spring member, and by which the biasing force of the spring member is transferred to the valve member and uniformly distributed across its seating surface.

Another object of this invention resides in the provision of a check valve for a dashpot or the like, comprising a valve member, a reinforcing member and a spring member, wherein all of said members are held assembled and in proper relationship to one another by other relatively fixed parts on the dashpot mechanism, without the need for other securement means.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
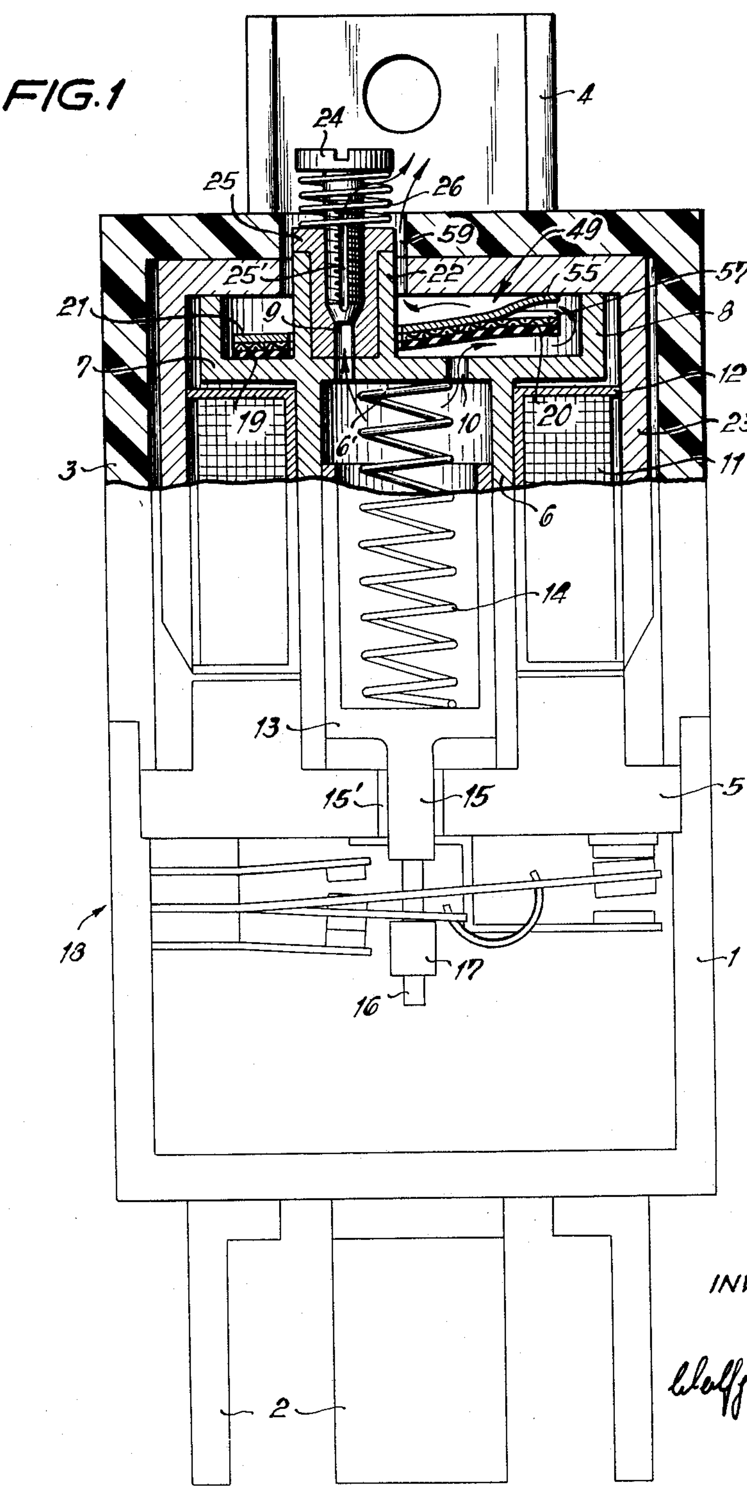
FIGURE 1 is a longitudinal sectional view of a self-interrupting relay of the type disclosed in the aforesaid Priesemuth patent application, embodying a dashpot or damper incorporating the check valve of this invention, the valve being shown in its open position in which it permits air to flow out of the dashpot chamber.
Figure 2:
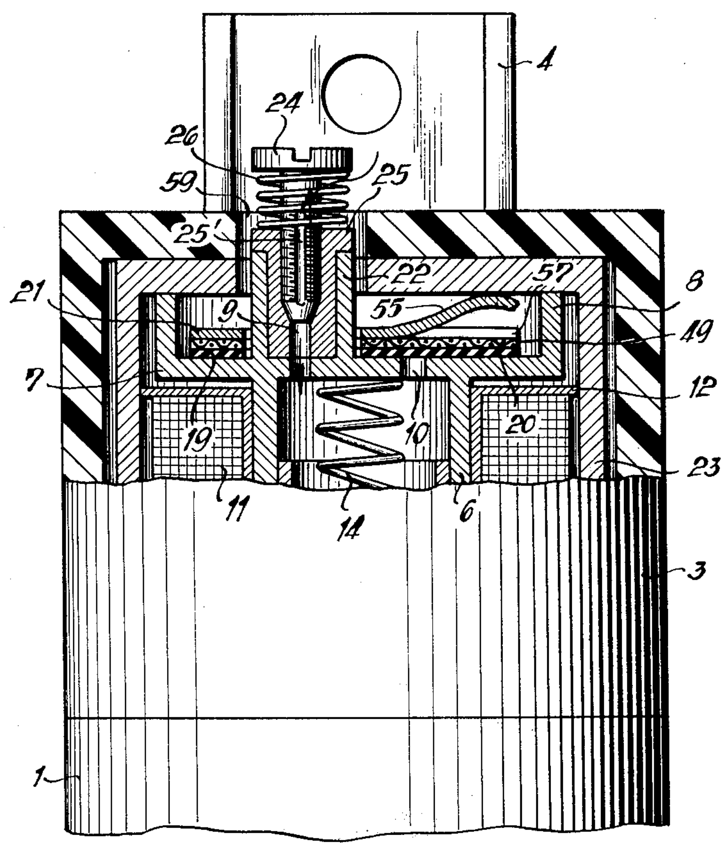
FIGURE 2 is a fragmentary view similar to FIGURE 1, but showing the check valve in its closed position.
Figure 3:
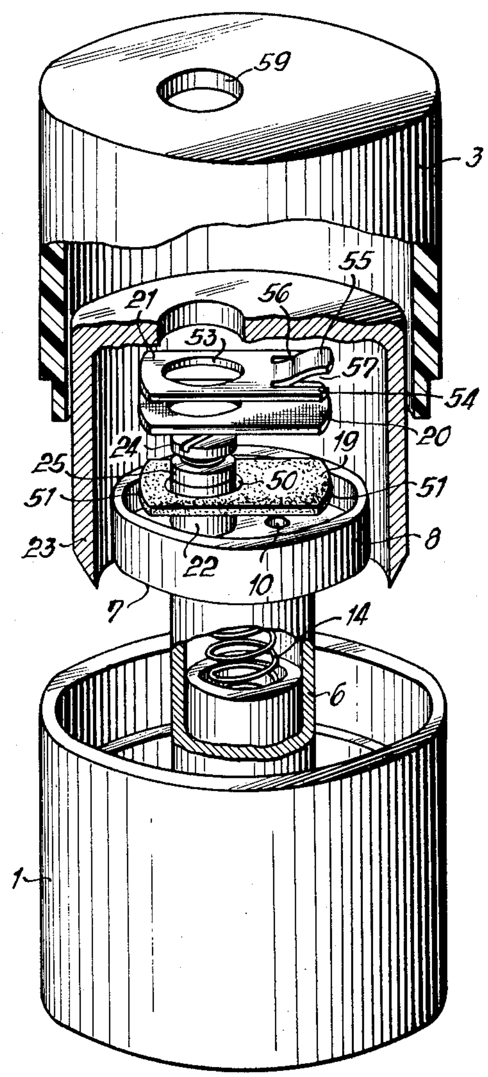
FIGURE 3 is an exploded perspective view of the dashpot.

Referring now more particularly to the accompanying drawings, the mechanism of this invention is enclosed in a housing comprising a cylindrical, cup-shaped lower housing member 1, and a cylindrical cup-shaped upper housing member 3 having the same outside diameter as the lower housing member. The upper and lower housing members are coaxially secured together with their end walls remote from one another, and a base member 5 extends across the housing substantially at the junction of the upper and lower members to provide a partition across the housing. The base member 5 and the lower housing member 1 cooperate to define a switch compartment in which is housed an overcenter snap switch mechanism 18 that is secured to the underside of the base member. An upper compartment, conjointly defined by the base member 5 and the upper housing member 3, encloses a solenoid 11 which is supported on the base member, a pneumatic cylinder 6 concentrically embraced by the solenoid, and a magnetically permeable plunger 13 slidable axially in the cylinder.

Both housing members, as well as the base member, are preferably of insulating material, and the lower housing member may be made of transparent material to permit observation of the switch mechanism 18 housed therein. Terminals 2 for the relay mechanism, which may comprise the prongs of a standard SAE plug, may be secured to the bottom wall of the housing. A suitable mounting bracket 4 may project upwardly from the top wall of the housing.

The solenoid 11 is wound upon a cylindrical coil form 12 of insulating material, which snugly embraces the pneumatic cylinder 6 and rests upon the base member. The cylinder is held concentric with the housing by having its lower end portion seated in a concentric counterbore in the base member. An inverted cup-shaped hood 23 of magnetically permeable material fits over the solenoid to confine the latter against displacement and to provide a return flux path around it.

The top wall 6' of the pneumatic cylinder 6 is radially extended to provide a circumferential flange 7 that overlies the top of the solenoid, and an upwardly projecting annular rim 8, coaxial with the cylinder, extends around the periphery of the flange 7 and engages the underside of the end wall of the cup-shaped hood 23. Since the hood directly underlies the end wall of the upper housing member 3, the pneumatic cylinder 6 is in effect confined between the base member and the end wall of the upper housing member to preclude axial displacement of the pneumatic cylinder and the solenoid.

The plunger 13 which is of course formed of magnetically permeable material and has a substantially snug sliding fit in the cylinder, has an upwardly opening concentric well in which is confined a coiled compression spring 14 that reacts between the bottom of the well in the plunger and the underside of the top wall 6′ of the cylinder to bias the plunger downwardly. The well in the plunger performs the further function of lightening the plunger and thereby decreasing its inertia.

The pneumatic cylinder 6 cooperates with the base member 5 to provide a chamber having walls of nonmagnetic material and which is air tight except for a bore 15′ opening through the base member, a bleed port 9, and an air outlet port 10 controlled by the check valve 49 of this invention, which is described in detail hereinafter. Both of said ports 9 and 10 are located in the top wall 6′ of the pneumatic cylinder, spaced to opposite sides of the cylinder axis. The bleed port 9 opens concentrically through a tubular projection 22 which is preferably formed integrally with the top wall 6′ of the cylinder, and which has a tubular sleeve 25 seated in its bore. The sleeve 25 is threaded to receive a throttling screw or needle valve 24 provided with a narrow longitudinal slot 25′ which permits a restricted flow of air into and out of the cylinder through the bleed port 9. The outer end portion of the tubular projection 22 projects through an aperture 59 in the end wall of the upper housing member, which aperture has a substantially larger diameter than the tubular projection so as to provide an outlet for air expelled from the cylinder through the air outlet port. The head of the screw 24 thus projects above the top wall of the relay housing so as to be accessible for adjustment, it being understood that inward adjustment of the screw reduces the rate at which air can flow into and out of the cylinder through the bleed port 9. A coiled spring 26 confined between the head of the throttling screw and the top of the sleeve 25 inhibits undesired rotation of the screw.

The check valve 49 which controls flow of air through the air outlet port 10 in the top wall of the pneumatic cylinder comprises a valve member 19, a reinforcing member 20 and a spring member 21.

The valve member 19 is stamped or otherwise formed from a suitable supple and nonporous sheet material, such as rubber, flexible sheet plastic or metal foil, and it has a generally rectangular outline. An aperture 50, located on the longitudinal centerline of the valve member but nearer to one end of it than to the other, more or less loosely receives the tubular projection 22 on the cylinder to permit the valve member to flatwise overlie the top wall 6′ of the cylinder, over the port 10 therein. The end portions of the valve member are rounded, as at 51, to correspond to the shape of the inner periphery of the annular rim 8 to which they are contiguous, and because of the eccentric location of the tubular projection 22 relative to the annular rim 8, the rounded end portions of the valve member cooperate with the annular rim 8 in limiting edgewise swiveling motion of the valve member about the tubular projection.

The spring member 21 may be stamped or otherwise formed from flat, flexible material and has an outline which corresponds generally to that of the valve member, having a similar aperture 53 in which the tubular projection 22 is received; but it has three parallel fingers 54, 55 and 56 which are defined by lengthwise extending slots 57 opening to the end of the spring member which is farthest from the aperture 53. The two outer fingers 54 and 56 are coplanar with the end portion of the spring member nearest the aperture 53, while the central finger 55 is bent obliquely upwardly to engage the underside of the top wall of the hood 23 and thereby maintain a downward bias upon the outer legs 54 and 56 by which they tend to hold the valve member flatwise against the top wall 6′ of the cylinder. Attention is directed to the fact that the outer legs 54 and 56 of the spring member overlie the valve member at opposite sides of the air outlet port 10.

The reinforcing member 20 serves to transfer the downward biasing force of the spring fingers 54 and 56 to the valve member and to distribute such force substantially uniformly over that portion of the valve member which is adapted to overlie the air outlet port 10. The reinforcing member is made of a suitable supple but inelastic material, such as fabric, and its shape may be identical to that of the valve member.

When the solenoid 11 is energized the plunger is drawn upwardly against the bias of the spring 14, and by reason of its substantially close fit in the cylinder the plunger expels air through the bleed port 9 and also through the check valve controlled air outlet port 10, which is cleared by reason of the fact that the members comprising the check valve are lifted away from the top of the cylinder by the force of the air being pushed out by the plunger. When the solenoid is de-energized the plunger moved downwardly in response to the bias of the compression spring, and the check valve seats in response to the biasing force exerted by the spring fingers 54, 55 and 56, blocking the port 10 and limiting the amount of air that can enter the cylinder to the restricted flow permitted by the throttling screw 24, thus retarding downward movement of the plunger to a slow rate governed by the setting of the throttling screw. The underside of the plunger is of course subjected to atmospheric pressure through the bore 15′ in the base member.

Both energization of the solenoid and the energization of a load connected with the relay are controlled by the overcenter switch mechanism 18 mounted at the bottom of the base 5, the construction and operation of which are fully described in the aforesaid copending application now Pat. No. 2,945,930. The plunger is connected to the actuating member of the switch by means of a stem-like downward extension 15 on the plunger.

From the foregoing description taken together with the accompanying drawings it will be apparent that this invention provides a damper or dashpot mechanism having a very simple, inexpensive and dependable check valve mechanism which permits air to flow freely out of the dashpot chamber during motion of the plunger in one direction, to enable the plunger to move quite rapidly in said direction, but which provides for a throttled flow of air into the chamber whereby motion of the plunger in the opposite direction is substantially retarded.

What is claimed as my invention is:

1. In a dashpot having means defining a substantially closed chamber, and a substantially closely fitting plunger in the chamber movable in opposite directions and which draws air into the chamber when it moves in one direction and expels air out of the chamber when it moves in the other direction, check valve means for restricting the flow of air into the chamber so as to retard motion of the plunger in said one direction and for permitting air to flow substantially freely out of the chamber to allow the plunger to move rapidly in said other direction, said check valve means comprising: a tubular projection on one wall of the chamber having a restricted bore providing for throttled flow of air into and out of the chamber, said projection being spaced from an air outlet port in said wall of the chamber; a flat valve member of supple, non-porous material having an aperture in which said tubular projection is received and which is adapted to flatwise overlie said wall of the chamber around the air outlet port; a unitary leaf spring member having an aperture in which said tubular projection is received and having three parallel integral spring fingers, the outer two of which flatwise overlie the valve member at opposite sides of the air outlet port and the center one of which is bent to an oblique angle relative to the other two fingers so as to be normally inclined away from said wall of the chamber; and fixed means on the chamber providing a surface spaced from and opposing said wall of the chamber and against which said center finger of the spring member engages to bias the outer two fingers into flatwise engagement with the valve member, yieldingly holding the valve member over the air outlet port to prevent air from entering the chamber through the same but permitting air to be expelled from the chamber through the air outlet port.

2. The dashpot of claim 1, further characterized by means fixed on said wall of the chamber and projecting therefrom to define shoulders which cooperate with edge portions of the valve member and the spring member to limit edgewise rotation of said members about the tubular projection.

3. The dashpot of claim 1, further characterized by a unitary flat reinforcing member of supple, substantially inelastic material having substantially the same shape as the valve member and flatwise overlying the latter between the valve member and the spring member, by which reinforcing member the biasing force of the spring fingers is transmitted to and uniformly distributed over the valve member.

4. The dashpot of claim 1, further characterized by a longitudinal slotted screw threaded into the bore of said tubular projection and by which the rate at which air flows through said projection may be adjusted.

References Cited in the file of this patent

UNITED STATES PATENTS

| | | |
|---|---|---|
| 2,139,931 | Brunkow | Dec. 13, 1938 |
| 2,316,924 | Whisler | Apr. 20, 1943 |
| 2,841,813 | Falk | July 8, 1958 |
| 2,945,930 | Priesmuth | July 19, 1960 |